J. B. ROOT.
Apparatus for Dissolving and Crystallizing.
No. 163,260. Patented May 11, 1875.
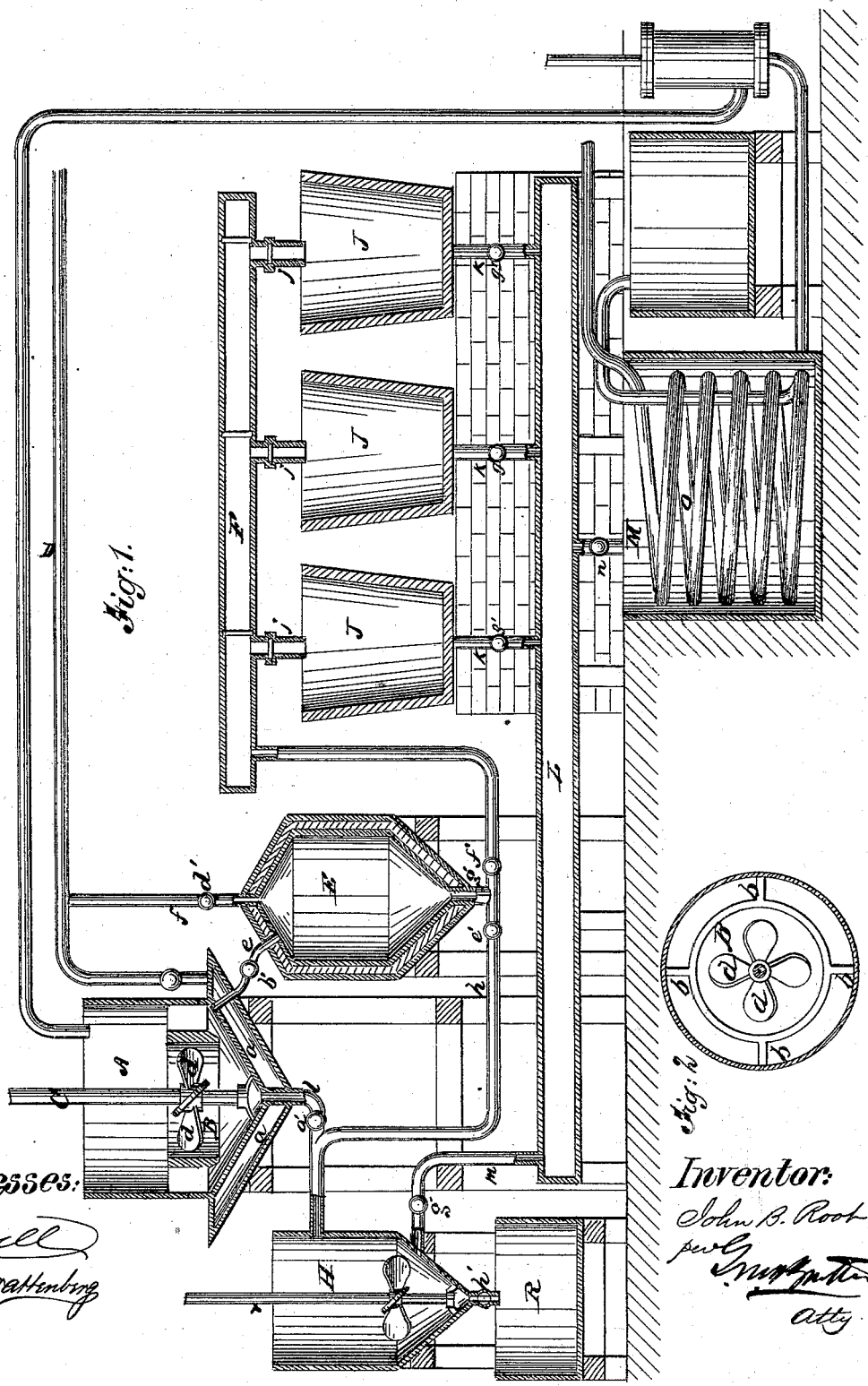

UNITED STATES PATENT OFFICE.

JOHN B. ROOT, OF NEW YORK, N. Y.

IMPROVEMENT IN APPARATUS FOR DISSOLVING AND CRYSTALLIZING.

Specification forming part of Letters Patent No. 163,260, dated May 11, 1875; application filed September 8, 1874.

*To all whom it may concern:*

Be it known that I, JOHN B. ROOT, of the city, county, and State of New York, have invented a new and Improved Purifying and Crystallizing Apparatus; and that the following is a full, clear, and exact description of the same, reference being had to the accompanying drawings, and to the letters of reference marked thereon, making a part of this specification.

This invention is in the nature of an improvement in apparatus for purifying and crystallizing soluble solids; and the invention consists in a tank provided with a steam-bottom, and constructed with an annulus and agitator; and, combined with the first-mentioned tank, a second tank, inclosed and jacketed with non-conducting material; and in conjunction with this tank a series of crystallizing-tanks; and, combined with these crystallizing-tanks, a liquor-reservoir provided with a steam-coil; and in connection with tank with annulus and jacketed tank, and also crystallizing-vessels, a receptacle with agitator and refuse-depository, all combined, arranged, and operated in the manner hereinafter fully described.

In the accompanying sheet of drawings, Figure 1 is a longitudinal section of my apparatus; and Fig. 2 a plan view of dissolving-tank, showing annulus and mixer.

Similar letters of reference indicate like parts in both figures.

In purifying, refining, and crystallizing soluble solids, such as acids, alkalies, gums, &c., a large percentage of loss is generally incurred by the imperfect washing of the crude material, so that the residuum, which has heretofore been considered worthless, has invariably contained a considerable percentage of the valuable principle.

To thoroughly extract from the crude material, and at the same time perform the purifying and crystallizing operation in an expeditious and economical manner, is the principal object of my invention. To this end I construct a tank, A, with a conical steam-bottom, $a$, and fitted within the tank an annulus, B. Into the tank A, and within the annulus B, is fitted an agitator, C. This agitator is formed with a vertical shaft, and with propeller-blades $d$, and is so contructed as to revolve freely within the tank. Passing into the steam-space under the tank A is a steam-pipe, D, leading from any suitable steam-generating appliance, and passing from the apex of the steam-bottom $a$ is a pipe, $l$, which extends to a tank, H, within which is fitted an agitator, $r$. At a convenient distance from the tank A is another tank, E, and from or near the top of this tank E to the interior of the tank A extends a pipe, $e$. The tank E is closed at its top, and its outer surface is covered with felt and otherwise jacketed to prevent loss of heat by radiation; and into the top of this tank a steam-pipe, $f$, is secured. This steam-pipe extends from the main steam-pipe D of the apparatus. Through the bottom of the tank E is fitted a pipe, $g$, which opens into another and larger pipe, $h$. One end of the pipe $h$ extends to and opens into a channel-way, F, and the other end of said pipe $h$ extends to and opens into the tank H. From the channel-way F are pipes or passages $j$, which open into tanks J. These last-mentioned tanks may be of any desired shape, but are preferably slightly conical. From the bottom of each of the tanks J extends a pipe, $k$, which opens into a channel-way, L. One end of this channel-way connects, by a pipe, $m$, with the bottom part of the tank H, and from said channel L extends a pipe, $n$, into a reservoir, M, within which is placed a steam-heating coil, $o$.

My apparatus being constructed substantially as above described, it is operated in the following manner: Water is placed into the tank A, and is heated by the steam admitted into its steam-bottom $a$ through the main steam-pipe D. When the water is in this way thoroughly heated the crude material which is to be purified and crystallized is placed within the tank, and the agitator C is forced to revolve, and its revolution causes the water and crude material to be thoroughly agitated, the action of the propeller-blades $d$ causing the crude material, which would otherwise gravitate to the bottom of the tank, to be in a state of suspension in the fluid until it is thoroughly dissolved, the water and crude material being lifted, as it were, through the annulus B, and caused to flow over its sides, the annulus acting as a separator to some extent, and the plates $b$ connecting the annulus to the sides of the tank prevent the fluid from acquiring a whirling motion in the tank. After the crude material has in this way become dissolved in the tank A the motion of the agitator is stopped, and the fluid within the tank allowed to remain in a quiet state for a short time, during which the heavy and earthy parts of the crude material will settle at the bottom of the tank, when a cock, $a'$, is opened, and the sediment allowed to pass through the pipe $l$ into the tank H. As soon as this deposit is removed (which is ascertained by the clearness of the fluid that passes into the tank H) the cock $a'$ is closed, and the cock $b'$ in the pipe $e$ is opened, when the clear liquor within the tank A will pass into the tank E. This tank being tightly closed and fitted and jacketed, the fluid is kept warm for some time without additional heat, and thus prevented from crystallizing within the tank E.

The fluid being now in the tank E, the cock $b'$ is closed and the cock $d'$ in the pipe $f$ is opened, admitting steam and pressure from the steam-pipe D into the tank E, on the surface of the fluid, forcing the fluid from the tank E, through the pipe $g$ in its bottom, into the pipe $h$. A cock, $e'$, in the pipe $h$ is now opened, and any residuum that may have settled in the bottom of the tank E is forced through the pipe $h$ into the tank H. The residuum being thus disposed of, the cock $e'$ is closed and the cock $f'$ is opened, when the clear fluid will be forced through the pipe through the channel-way F, whence it passes by the pipe $j$ into the crystallizing-tanks J, where it is allowed to cool and deposit its crystals. After crystallization the cocks $g'$ in the pipes $k$ are opened and the mother-liquor contained in the crystallizing-tanks is allowed to pass into the channel-way L, and thence through the pipe $n$ into the reservoir $m$, where it is again heated by a steam-coil, $o$, and returned to the tank A, to be added to the new solution contained therein, to be again boiled, agitated, cooled, and crystallized in the manner just described. The residuum that has passed into the tank H from the tanks A and E has added to it hot water, and this water and the residuum are thoroughly agitated by the agitator $r$, which washes the residuum very thoroughly and makes it part with any valuable principle it may contain. This being done, a cock, $h'$ is opened, and the exhausted residuum allowed to pass into the refuse-tank R. The clear fluid within the tank H is then allowed to pass through the pipe $m$ (by opening the cock $g'$) into the channel-way L, and thence through the pipe $n$ into the reservoir M, to mingle with the mother-water or liquid already contained therein and to be returned into the tank A, in the manner before described.

From the foregoing description of the construction and operation of my apparatus, it is obvious that the dissolving of the crude material is rapidly and perfectly effected with the least amount of heat possible, and that the unsoluble and earthy parts of the crude material are forced to part with all of their valuable principles before they are finally disposed of, and that the fluid or mother-liquor must give up all the solid that is held in solution, so that, as a matter of fact, all that is valuable in the crude material is saved, while the heat applied for making the solution is utilized to the utmost extent.

Having thus described my invention, what I claim as new, and desire to secure by Letters Patent, is—

1. In an apparatus for purifying and crystallizing soluble solids, a dissolving-tank combined with an air-tight and jacketed receiver, substantially as and for the purpose described.

2. In an apparatus for purifying and crystallizing soluble solids, the combination of a dissolving-tank with an air-tight and jacketed receiver, and a residuum-tank, substantially as and for the purpose described.

3. In an apparatus for purifying and crystallizing soluble solids, an air-tight and jacketed tank, as and for the purpose shown and described.

4. The within-described method of purifying and crystallizing soluble solids, consisting in dissolving the solid by heat and agitation, conveying such solution to an air-tight receiver, and thence to crystallizing-tanks, the residuum being subjected to further agitation and solution, and, with the mother-water from the crystallizing-tanks, heated and returned to the dissolving-tank, substantially as specified.

5. In an apparatus for purifying and crystallizing soluble solids, the combination of a tank, constructed with steam-bottom, agitator, and annulus, with a residuum-tank, provided with an agitator, one or more air-tight jacketed tanks, and one or more crystallizing-tanks, and all arranged, constructed, and combined as and for the purpose hereinbefore shown and described.

JOHN B. ROOT.

Witnesses:
H. L. WATTENBERG,
G. M. PLYMPTON.